(12) United States Patent
Wein

(10) Patent No.: US 9,888,550 B2
(45) Date of Patent: *Feb. 6, 2018

(54) WEARABLE ACCESSORY WITH LIGHTING EFFECT

(71) Applicant: Michael Wein, Houston, TX (US)

(72) Inventor: Michael Wein, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,032

(22) Filed: Oct. 17, 2016

(65) Prior Publication Data

US 2018/0014385 A1  Jan. 11, 2018

Related U.S. Application Data

(63) Continuation of application No. 14/797,034, filed on Jul. 10, 2015, now Pat. No. 9,474,137, which is a continuation-in-part of application No. 14/250,074, filed on Apr. 10, 2014, now Pat. No. 9,109,763, which is a continuation of application No. 13/366,243, filed on Feb. 3, 2012, now Pat. No. 9,111,184, which is a continuation-in-part of application No. PCT/US2010/043839, filed on Jul. 30, 2010, which is a continuation-in-part of application No. 12/534,813, filed on Aug. 3, 2009, now Pat. No. 8,006,899.

(51) Int. Cl.
| | | |
|---|---|---|
| *H05B 37/02* | (2006.01) | |
| *F21V 21/40* | (2006.01) | |
| *F21V 23/04* | (2006.01) | |
| *A41D 19/015* | (2006.01) | |
| *A43B 3/00* | (2006.01) | |
| *A42B 1/24* | (2006.01) | |
| *H04B 1/3827* | (2015.01) | |
| *G07C 9/00* | (2006.01) | |

(52) U.S. Cl.
CPC ..... *H05B 37/0272* (2013.01); *G07C 9/00119* (2013.01); *H04B 1/385* (2013.01); *H05B 37/029* (2013.01); *H05B 37/0236* (2013.01)

(58) Field of Classification Search
None
See application file for complete search history.

(56) References Cited

U.S. PATENT DOCUMENTS

2014/0184386 A1* 7/2014 Regler .................. G08B 5/228
340/7.61

* cited by examiner

*Primary Examiner* — Dedei K Hammond
(74) *Attorney, Agent, or Firm* — Rao DeBoer Osterrieder, PLLC; Dileep P. Rao

(57) ABSTRACT

A wearable accessory having an embedded processor in a substrate for creating a synchronously presented lighting effect at a controlled access venue and a method for creating a synchronously presented lighting effect at a controlled access venue while controlling access to the venue, simultaneously using a wearable accessory that coordinates with the performance allowing each audience member with a wearable accessory to synchronously perform with the performance.

21 Claims, 5 Drawing Sheets

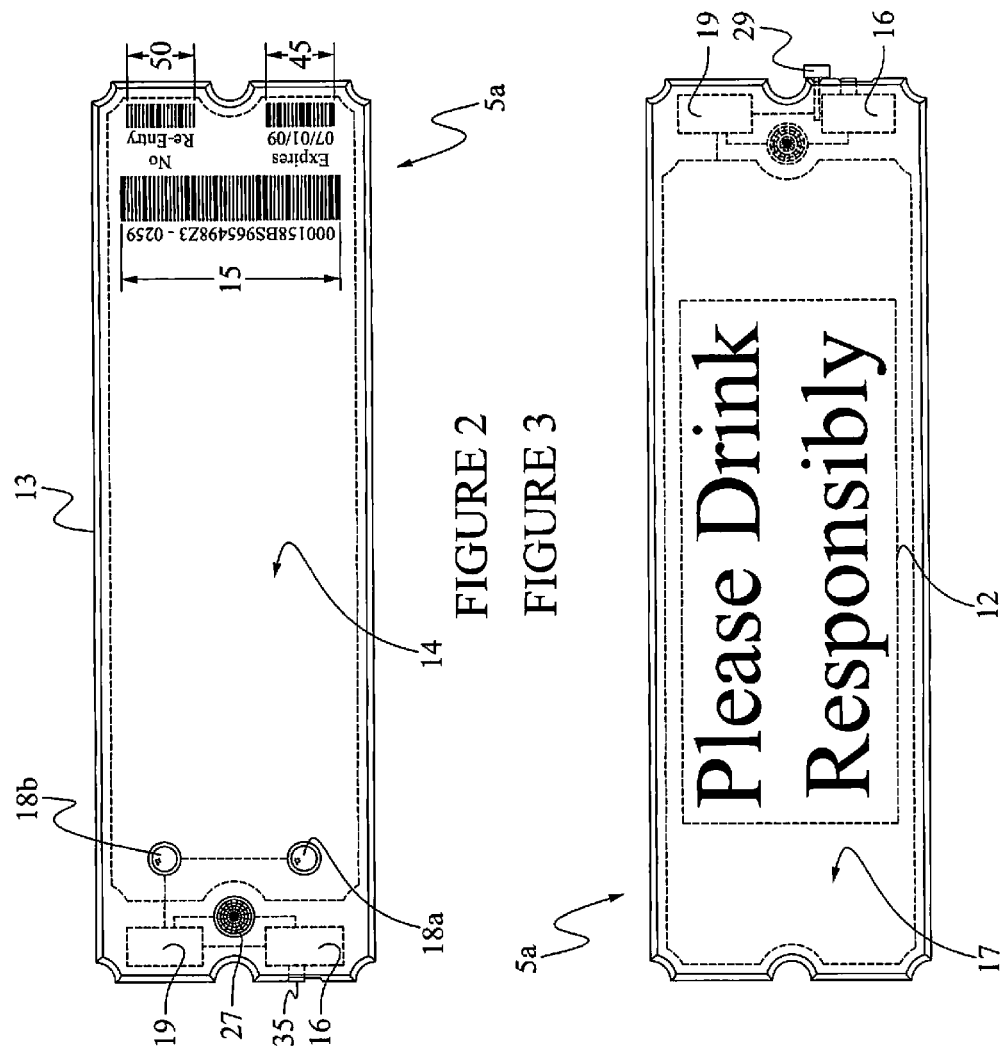

WEARABLE ACCESSORY WITH LIGHTING EFFECT

CROSS REFERENCE TO RELATED APPLICATIONS

The present application is a Continuation of co-pending U.S. patent application Ser. No. 14/797,918, filed on Jul. 13, 2015, entitled "ENTRANCE TICKET WITH LIGHTING EFFECT", which is now issued as U.S. Pat. No. 9,485,841, which is a Continuation of application Ser. No. 13/366,243, filed on Feb. 3, 2012, which is now issued as U.S. Pat. No. 9,111,184 B2, which is a Continuation in Part of International Application No. PCT/US2010/043839, filed on Jul. 30, 2010, entitled "ENTRANCE TICKET WITH LIGHTING EFFECT," which claims priority to U.S. patent application Ser. No. 12/534,813 filed on Aug. 3, 2009 entitled, "ENTRANCE TICKET WITH LIGHTING EFFECT," which is now issued as U.S. Pat. No. 8,006,899. These references are hereby incorporated in their entirety.

FIELD

The present embodiments generally relate to a plurality of wearable accessories and a method of using the a plurality of wearable accessories to provide admission to a controlled access venue and to create a lighting effect synchronized with other audience members, enabling the holder to gain admission to the venue and to participate with a performance at the venue.

BACKGROUND

A need exists for a plurality of wearable accessories that can provide for tracking of admissions, controlling access of admissions, as well as enabling a wearer to interact with a performance at a controlled access venue, thereby enabling the wearer to more fully become involved in a performance.

A need exists for a method of using a plurality of wearable accessories that can provide for tracking of admissions, controlling access of admissions, as well as enabling a wearer to interact with a performance at a controlled access venue, thereby enabling the apparatus holder to more fully become involved in a performance.

The present embodiments meet these needs.

BRIEF DESCRIPTION OF THE DRAWINGS

The detailed description will be better understood in conjunction with the accompanying drawings as follows:

FIG. 2 is a front view of the ticket.

FIG. 3 shows a back view of the ticket.

Figure 1A:
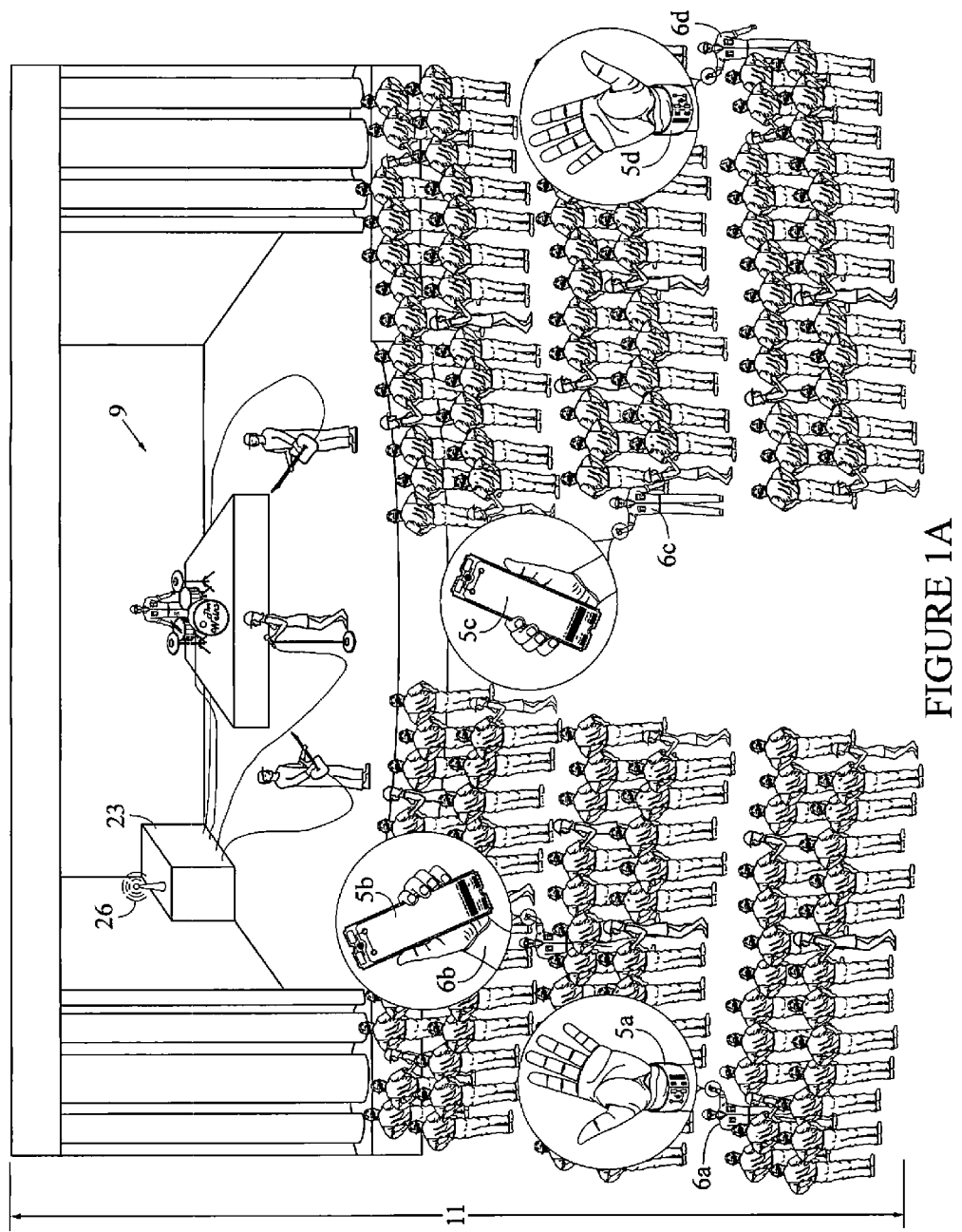
FIG. 1A shows a diagram of a controlled access venue with the wearable accessories for the lighting effect contained in it.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that the invention can be practiced or carried out in various ways.

The present embodiments relate to a ticket that produces a lighting effect that is usable with a controlled access venue.

The embodiments can use at least one and up to a plurality of tickets at the same time, at a venue.

The tickets can create a synchronously presented lighting effect from an audience in a controlled access venue, such as a music theater or a concert hall, during a performance.

Each of the plurality of tickets can have a substrate with a first side for supporting a readable identification code and a second side for supporting a message such as "don't smoke" or "danger high decibels expected." The substrate can have a thickness less than about 0.4 inches, can weigh less than about 2 ounces, and can be flexible.

The identification code can be a bar code, a numerical code, an alphanumeric code, a radio frequency identification "RFID" tag, or a series of "check digits" used to verify a code, which are known in the warehouse packing industry.

A power source can be disposed or embedded within the substrate, such as a small camera battery or other battery. The power source can be from about 1 volt to about 9 volts and can originate from a battery such as a hearing aid battery, a printable battery, a watch battery, a lithium ion battery, a rechargeable battery, a solar battery, or any other commercially available battery.

At least one light, but up to about 50 lights can be electrically connected to the power source for use during the performance. The light can be a light emitting diode "LED".

A controller with a processor, and a data storage can be disposed in the substrate. The processor can be in communication with the data storage and can further be in electrical communication with the power source and the at least one light.

Computer instructions can be stored in the data storage, which can be used to instruct the processor to operate the lights in a predetermined sequence. The processor can be activated by a musical beat, by a melody, by a pitch line, or the processor can activate as a reaction to the performance on the stage of the controlled access venue. The data storage can be flash memory. The processor can be microprocessor.

The ticket can have an actuator associated with the substrate which can be, in an embodiment, embedded in the substrate for initiating flashing of the lights based on a predetermined set of computer instructions which determine how the lights flash, including the sequence of the flashing.

The actuator can be in direct communication with the processor. The actuator can be a sound receiver that can receive a sound from the stage or a signal from a performance transmitter and can then initiate the lighting effect. The signal from the performance transmitter can be referred to herein as a first signal.

The sound receiver can be a microphone or any other commercially available sound receiver.

The ticket can have an actuator that is a pull tab, which can be disposed at least partially in the substrate acting as a separator between the power source and the processor, so that when the pull tab is removed a connection between the processor and the power source is formed such that the processor can receive power and can utilize the computer instructions on the data storage which determines the sequence of the lighting effect.

In operation, the pull tab can be torn off of the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and processor, allowing the processor to be initiated.

In an embodiment, the pull tab can be disposed on a tear tab, such as a perforated ticket stub. The tear tab can be removed from the ticket or substrate by tearing the tear tab from the ticket or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that the ticket is only usable for one performance.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

Combinations of actuators can be usable in an embodiment of the ticket.

The processor of each ticket can operate synchronously to create a lighting effect such as three short flashing lights, followed by two long flashing lights, followed by three short light flashes to interact and send a message with music being performed on stage. Another part of the same audience can have different computer instructions, which flash those lights in a counterpoint beat to the first group of audience members. Similarly, there can be a third group of audience members, which can be all with green lights, that flash as a group in between the other flashing lights which can be red or blue. Additional colors or multicolored lights can be useable with the embodiments.

Simultaneously the processors for the plurality of tickets can synchronously operate during the performance all the while serving the dual purpose of controlling access to the controlled access venue. These unique tickets can allow each holder to interactively participate with the performance as a member of the performance with the ticket.

The tickets can be contemplated in an embodiment to have a flexible substrate, which can be reusable. In an embodiment, the flexible substrate can have a thickness of less than about 1 inch, and a weight of less than about 5 ounces.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of tickets.

An embodiment can contemplate that the audio signal and the wireless signal can come from the network, which can be initiated at a predetermined time.

In an embodiment, the audio signal and the wireless signal can be generated by a user, such as by a disc jockey "DJ", an operator, a sound technician, or similar user, by tapping a beat using a mouse, an IPOD™, an IPHONE™, or another similar device, which can be in communication with the network, such as with a computer, laptop, personal digital assistant, a cellular phone, or combinations thereof.

The ticket can additionally have an expiration date programmed into the computer instructions in the data storage for deactivating the processor, so that a ticket used for the Beach Boys in New Jersey, on Jun. 22, 2009 cannot be used again to see the Beach Boys in Chicago on Jun. 23, 2009.

It can be contemplated that the light can be a light emitting diode (LED), a fluorescent light, a halogen light, a neon light, or combinations thereof.

Another embodiment can contemplate that an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the ticket in series, in parallel, or combinations thereof, to the power source.

An embodiment contemplates that the substrate can also include a lighter and the actuator can be a removable pin removable from the lighter to allow the sequence of lights to electrically engage the power source and initiate.

The lighter can have a case, which can be 100 percent engulfed with electroluminescence, electroluminescent wires, or chemi-luminescence paint or a similar coating that appears to glow independently without the need for any additional stimulating light. An embodiment can be contemplated for use with black lights.

In an embodiment, the ticket can be imprinted and a "smart" lighter with a removable pin for engaging the lighter, such as a magnet pin that can be detachable at the venue with a security controllable pin removing device.

In this embodiment, the lighter can also include a microprocessor and data storage, which can also have computer instructions for producing a lighting effect as described previously.

Another embodiment can contemplate that the removable pin can only be removable by a security guard, that the removable pin can in fact be a security controllable pin that can require a security controllable pin removing device that is only used at an entrance to the controlled access venue.

The substrate of the apparatus can be contemplated to be one or more of the following types of items: a stiff paper, a non-forming flexible but crystalline plastic, a cardboard sheet, a thin aluminum plate, a flexible metal plate, a rubberized plate or a 2 millimeter thin plate of another flexible but shape supporting synthetic material.

The power source can be a AAA DC battery, a AA battery, a lithium ion battery, a solar cell, a watch battery, a hearing aid battery, or any other commercially available battery. It can be contemplated that the power source can be rechargeable for an embodiment. It can be contemplated that the power source can be replaceable for another embodiment.

It can be contemplated that the power source can be a printable battery, such as one from the Fraunhofer Research Institution for Electronic Nano Systems ENAS, of Germany. This embodiment is environmentally friendly, as the printable battery contains to no mercury.

The ticket can include a substrate that can operate as a wrist band, a neck band, head gear, a neck lanyard, a brooch, a T-shirt, sunglasses, or another wearable ticket with a lighting effect.

An embodiment contemplates that the apparatus can have a "no reentry" code, which can prohibit reentry of apparatus to the controlled access venue.

In order to more fully understand the ticket, an embodiment of a method of using the apparatus can include the steps of:

(a) gaining access to a controlled access venue using a ticket with a substrate, with an actuator embedded within the substrate, wherein the actuator is connected to a power source embedded in the substrate, at least one light embedded in the substrate, a controller with a processor embedded in the substrate, data storage communicating with the processor embedded in the substrate, computer instructions in the data storage for instructing the processor to operate at least one light;

(b) actuating at least one light on the ticket comprising a step selected from the group consisting of: pulling on a pull tab; receiving a first signal from a performance transmitter; tearing off a tear tab disposed on the substrate, wherein a pull tab is disposed on the tear tab; engaging a switch embedded in the substrate; receiving a second signal from a network transmitter connected to a network; actuating a switch disposed on the substrate; and receiving a first signal from a performance venue; and (c) receiving a second signal from a network to synchronously operate each of the least one lights to create a synchronous lighting effect with each processor of each ticket in an audience, while controlling access to the controlled access venue, allowing each member of the audience to interactively participate with a performance.

Turning now to the Figures, FIG. 1A shows a controlled access venue 11 with a plurality of tickets, 5a, 5b, 5c, 5d. Each ticket can be held by a member of the audience 6a, 6b, 6c, 6d. The performance 9 can occur on a stage in front of the audience or can be viewable by the audience. The performance can be remote, or can be electronically connected to the audience in the manner of live aid concerts, which can have remote audiences to the show going on in London.

Also shown in FIG. 1A is a performance transmitter 23 for transmitting a first signal 26.

Figure 1B:
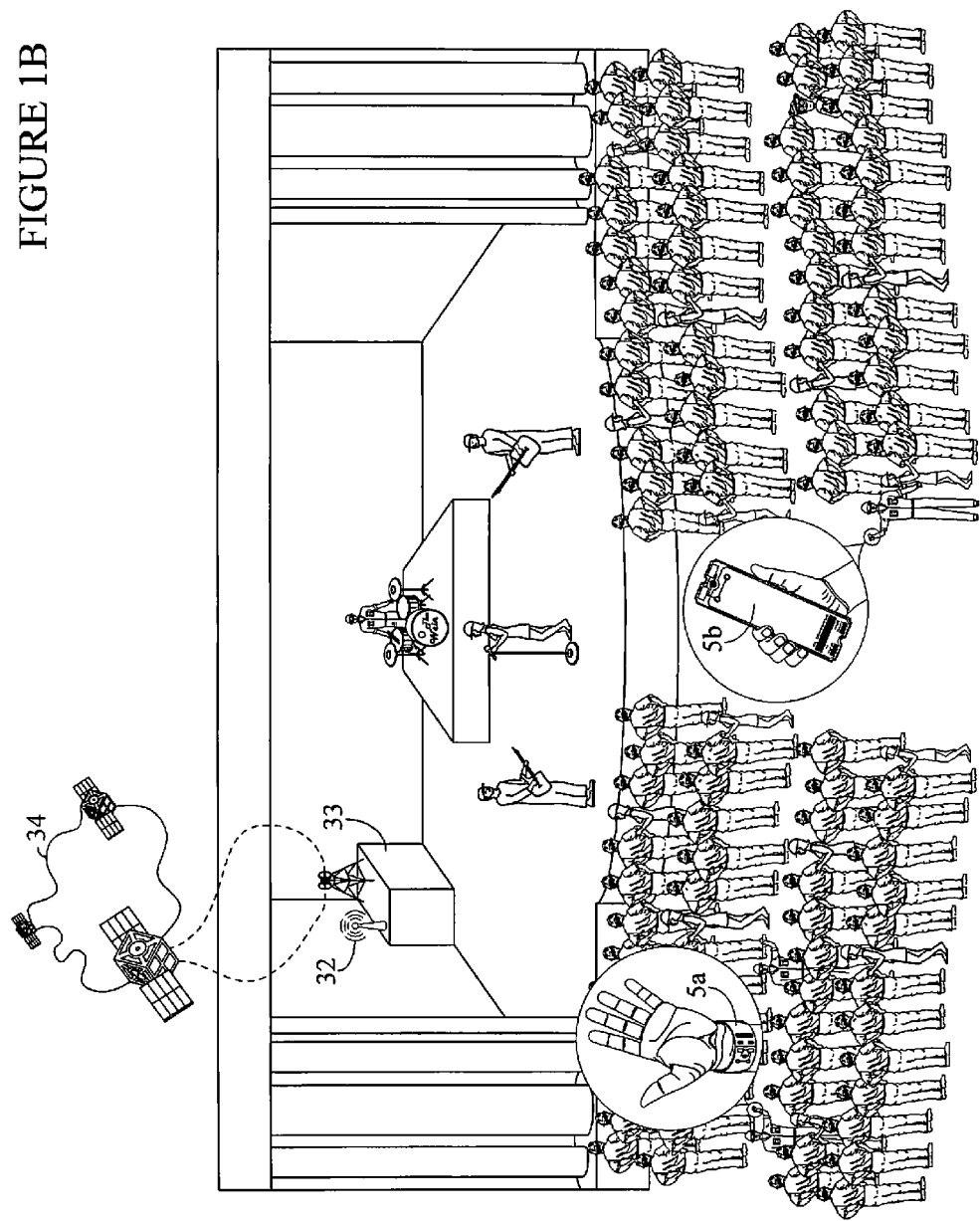
FIG. 1B shows an alternative embodiment of a diagram of a controlled access venue with the wearable accessories for the lighting effect contained in it.

FIG. 1B shows an alternative embodiment of FIG. 1A, with a network 34 in communication with a network transmitter 33 for transmitting a second signal 32 to the plurality of tickets 5a, 5b, 5c, 5d.

FIG. 2 shows a front view of a ticket 5a. The ticket can have a substrate 13, which can be flexible and can be made of a plastic. The plastic can be clear and transparent. The plastic can also be a crystalline polypropylene or homopolymer of polyethylene that can withstand temperatures up to about 112 Fahrenheit without deforming or melting.

The substrate 13 can have a first side 14, which can have a non-removable readable identification code 15. The identification code can be intended to not only be readable by a scanner, such as a bar code, but can be readable or scanned by a human.

In the substrate 13 can have a power source 16 that can be battery. Also in the first side 14 can be a first light 18a and a second light 18b, which can be the same color, different colors, or multicolored. The lights can be connected to the power source 16.

A controller 19 can also be connected to at least one light 18a, 18b, which can be connected in series, in parallel, or combinations thereof. The controller 19 can be in communication with the power source 16.

FIG. 2 also shows the sound receiver 27 which is depicted connected to the power supply 16 and the controller 19. The sound receiver 27 can be a wireless signal receiver, or an infra red detector, which the first signal can be transmitted to via the network.

The ticket is shown with a switch 35 for actuating the lighting effect using the lights. The ticket can also have an expiration date 45 and a no reentry code 50.

It can be contemplated that additional embodiment can have the following features:

FIG. 3 shows the opposite side of the ticket 5a of FIG. 2 with the second side 17 supporting a message 12. This Figure also shows the pull tab 29, which is disposed as a block between the controller 19 and the power source 16. In this embodiment, once the pull tab is pulled or torn, it will remove the block from the power source to the controller and initiate the lighting effect.

Figure 4:
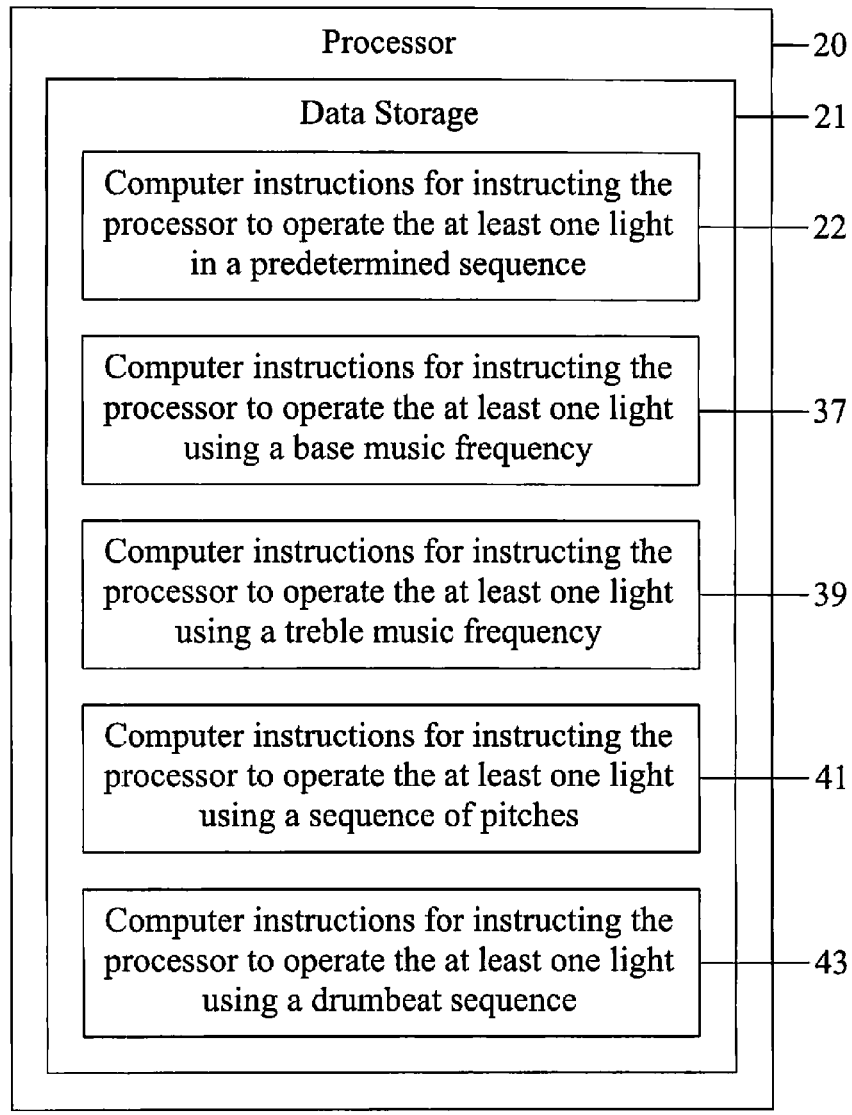
FIG. 4 is a diagram of the processor with computer instructions in data storage.

FIG. 4 shows a processor 20 with data storage 2, which can further have computer instructions 22, which can include computer instructions to instruct the processor to operate the at least one light using a predetermined sequence 22, a bass music frequency 37, a treble music frequency 39, a sequence of pitches 41 or a drumbeat sequence 43.

The lighting effect can be pulsed based on the beat or tempo of the music. The lights can be individually preprogrammed lights with flashing sequences. The lights can be operated based on a seat location and can be based on the audio sequence of the performance.

In an embodiment, certain lights on certain tickets can operate based on the performer, such as group A can operate during the drumbeat sequence, provided by a drummer of the performance, and group B can operate during the bass music frequency, provided by a bassist of the performance.

The lights can change in intensity, color, pulsation, on/off signaling based on the mood of the music, the tempo of the music and the dynamic of the music.

The colors of the lights can further be operated based on sponsorships of the venue.

Figure 5:
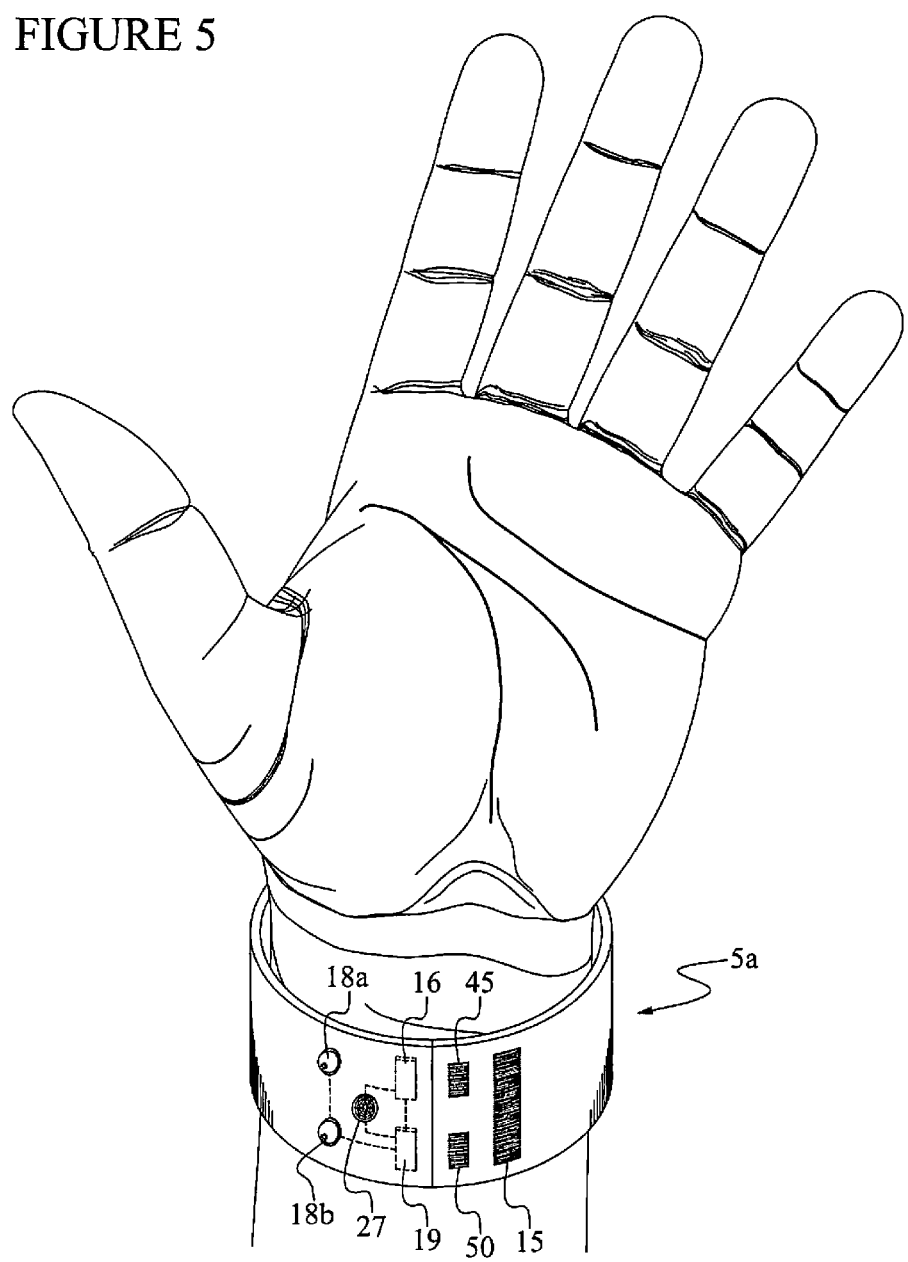
FIG. 5 shows a wristband embodiment of the wearable accessory.

FIG. 5 shows an embodiment of the ticket 5a, wherein the ticket 5a is a wristband. The wristband embodiment of the ticket 5a is further shown with first light 18a and second light 18b in communication with the controller 19 and the power source 16 as previously described in FIGS. 2 and 3.

While these embodiments have been described with emphasis on the embodiments, it should be understood that within the scope of the appended claims, the embodiments might be practiced other than as specifically described herein.

What is claimed is:

1. A plurality of wearable accessories for creating a synchronously presented lighting effect from an audience in a controlled access venue for a performance, wherein each of the plurality of wearable accessories comprises:
   a. a substrate;
   b. a power source embedded in the substrate;
   c. at least one light electrically connected to the power source;
   d. a controller comprising:
      a processor;
      a data storage; and
      computer instructions stored in the data storage for instructing the processor to operate the at least one light;
   e. an actuator associated with the substrate and in communication with the processor;
      wherein the actuator communicates a signal to the processor to initiate the synchronously presented lighting effect, and wherein the actuator is a member of the group comprising:
         i. a sound receiver;
         ii. a pull tab;
         iii. a wireless signal receiver;
         iv. an infrared detector;
         v. a switch disposed on the substrate; and
         vi. combination thereof;
      wherein the processor of each wearable accessory operates to create a specific lighting effect for that wearable accessory so that the synchronously presented lighting effect is created within the controlled access venue during the performance by the plurality of wearable accessories allowing each audience member wearing one or more of such wearable items to inactively participate with the performance.

2. The plurality of wearable accessories of claim 1, wherein one or more wearable accessories of the plurality of wearable accessories enables audience members to gain admission to the controlled access venue.

3. The plurality of wearable accessories of claim 1, wherein one or more wearable accessories of the plurality of wearable accessories are tracked to control access to the controlled access venue.

4. The plurality of wearable accessories of claim 1, wherein one or more wearable accessories of the plurality of wearable accessories has an identification code.

5. The plurality of wearable accessories of claim 4, wherein the identification code is used to create the synchronously presented lighting effect from the audience in the controlled access venue for the performance.

6. The plurality of wearable accessories of claim 1, wherein location is used to create the synchronously presented lighting effect from the audience in the controlled access venue for the performance.

7. The plurality of wearable accessories of claim 1, wherein a transmitter is used to transmit real time computer instructions to the processor.

8. The plurality of wearable accessories of claim 1, wherein different parts of the audience can have different computer instructions for the synchronously presented lighting effect.

9. The plurality of wearable accessories of claim 1, wherein the synchronously presented lighting effect comprises different lighting effects for different parts of the audience based on location.

10. The plurality of wearable accessories of claim 1, wherein the synchronously presented lighting effect comprises different computer instructions for multiple groups within the audience.

11. The plurality of wearable accessories of claim 1, wherein the synchronously presented lighting effect is initiated by a sound or a signal received from a performance transmitter.

12. The plurality of wearable accessories of claim 1, wherein the signal comprises:
audio signals;
infrared signals; and
wireless signals;
wherein the signal initiates the synchronously presented lighting effect at a predetermined time or in a predetermined sequence.

13. The plurality of wearable accessories of claim 1, wherein the signal comprises:
audio signals;
infrared signals; and
wireless signals;
wherein the signal is generated by a user by tapping a smart device in communication with a network to control the synchronously presented lighting effect.

14. The plurality of wearable accessories of claim 1, wherein the actuator initiates the processor when it receives a signal from a network transmitter connected to a network to start a lighting sequence or to change a lighting sequence that has been started.

15. The plurality of wearable accessories of claim 1, wherein at least one of the plurality of wearable accessories is reusable.

16. The plurality of wearable accessories of claim 1, wherein at least one of the plurality of wearable accessories has an expiration date programmed into the computer instructions in the data storage.

17. The plurality of wearable accessories of claim 1, wherein the synchronously presented lighting effect is operated based on sponsorship of the controlled access venue.

18. The plurality of wearable accessories of claim 1, wherein the at least one light comprises a plurality of lights connected in series, in parallel, or combinations thereof, to the power source.

19. The plurality of wearable accessories of claim 1, wherein the substrate comprises: a wristband, a neck lanyard, a neck band, head gear, a brooch, a T-shirt, sunglasses, or another wearable accessory with a lighting effect.

20. The plurality of wearable accessories of claim 1, wherein at least the audience or the performance is remote.

21. A method for creating a synchronously presented lighting effect in a controlled access venue, the method comprising:
  a. gaining access to the controlled access venue using a wearable accessory, wherein the wearable accessory comprises:
    i. a substrate with an actuator embedded within the substrate, wherein the actuator is connected to a power source embedded in the substrate;
    ii. at least one light embedded within the substrate;
    iii. a controller with a processor embedded in the substrate;
    iv. a data storage communicating with the processor embedded in the substrate; and
    v. computer instructions in the data storage for instructing the processor to operate the at least one light;
  b. actuating the at least one light on the wearable accessory comprising a step selected from the group consisting of:
    i. pull on a pull tab;
    ii. receiving a first signal from a performance transmitter;
    iii. tearing off a tear tab on the substrate, wherein a pull tab is disposed on the tear tab;
    iv. engaging a switch embedded in the substrate;
    v. receiving a second signal from a network transmitter connected to a network;
    vi. actuating a switch disposed on the substrate;
    vii. receiving a wireless signal;
    viii. detecting an infrared signal; and
    ix. receiving a first signal from a performance venue; and
  c. receiving a signal from a network to synchronously operate at least one of the wearable accessories to create the synchronously presented lighting effect with the processor of each wearable accessory in an audience, while controlling access to the controlled access venue, allowing each member of the audience to interactively participate with a performance.

* * * * *

UNITED STATES PATENT AND TRADEMARK OFFICE
CERTIFICATE OF CORRECTION

PATENT NO. : 9,888,550 B2  
APPLICATION NO. : 15/296032  
DATED : February 6, 2018  
INVENTOR(S) : Michael Wein Page 1 of 1

It is certified that error appears in the above-identified patent and that said Letters Patent is hereby corrected as shown below:

Column 7, Line 6, in Claim 1 the word -inactively- should be --interactively--.

Signed and Sealed this
Seventeenth Day of April, 2018

Andrei Iancu
*Director of the United States Patent and Trademark Office*